(12) United States Patent
Mathews et al.

(10) Patent No.: US 8,645,249 B2
(45) Date of Patent: Feb. 4, 2014

(54) SYSTEMS, METHODS AND COMPUTER PROGRAM PRODUCTS FOR MODELING UNCERTAIN FUTURE BENEFITS

(75) Inventors: Scott H. Mathews, Seattle, WA (US); Vinay T. Datar, Mercer Island, WA (US); Christopher A. Forgie, Salt Lake City, UT (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/487,965

(22) Filed: Jun. 4, 2012

(65) Prior Publication Data

US 2012/0245977 A1 Sep. 27, 2012

Related U.S. Application Data

(62) Division of application No. 10/453,396, filed on Jun. 3, 2003, now abandoned.

(51) Int. Cl.
*G06Q 40/00* (2012.01)
*G06Q 10/00* (2012.01)
*G06Q 20/00* (2012.01)

(52) U.S. Cl.
USPC ............... 705/35; 705/28; 705/20; 705/36

(58) Field of Classification Search
USPC ......................................... 705/35, 36, 20, 28
See application file for complete search history.

(56) References Cited

U.S. PATENT DOCUMENTS

| | | |
|---|---|---|
| 5,377,095 A | 12/1994 | Maeda et al. |
| 5,692,233 A | 11/1997 | Garman |
| 5,710,578 A | 1/1998 | Beauregard et al. |
| 5,960,407 A | 9/1999 | Vivona |
| 6,061,662 A | 5/2000 | Makivic |
| 6,078,893 A | 6/2000 | Ouimet et al. |
| 6,078,901 A | 6/2000 | Ching |
| 6,157,918 A | 12/2000 | Shepherd |
| 6,205,431 B1 | 3/2001 | Willemain et al. |
| 6,321,205 B1 | 11/2001 | Eder |
| 6,321,212 B1 | 11/2001 | Lange |
| 6,381,586 B1 | 4/2002 | Glasserman et al. |

(Continued)

FOREIGN PATENT DOCUMENTS

| | | |
|---|---|---|
| EP | 1 178 416 A1 | 2/2002 |
| JP | 2001357189 A | 12/2001 |

OTHER PUBLICATIONS

Eric L. Burgess, Hany S. Gobrieal; *Integrating Spacecraft Design and Cost-Risk Analysis Using NASA Technology Readiness Levels*; Feb. 1996; 29th Annual DoD Cost Analysis Symposium, Leesburg, Virginia; 14 pages; The Aerospace Corpoation; Herndon, Virginia.

(Continued)

*Primary Examiner* — Rajesh Khattar
(74) *Attorney, Agent, or Firm* — Alston & Bird LLP

(57) ABSTRACT

Systems, methods and computer program products are provided for modeling future benefits. According to the method, modeling future benefits begins by defining a growth rate for the good for each time segment of a period of time, where the period of time includes a plurality of time segments. An uncertainty for the good is then determined for each time segment. Next, a benefit distribution is determined for each time segment based upon the growth rate and uncertainty for the respective time segment. Finally, a benefit value is selected for each time segment by randomly selecting each benefit value based upon a respective benefit distribution to thereby model future benefits over the period of time.

36 Claims, 7 Drawing Sheets

(56) References Cited

U.S. PATENT DOCUMENTS

| | | |
|---|---|---|
| 6,393,406 B1 | 5/2002 | Eder |
| 6,629,082 B1 | 9/2003 | Hambrecht et al. |
| 6,810,332 B2 | 10/2004 | Harrison |
| 6,853,952 B2 | 2/2005 | Chadwick |
| 6,862,579 B2 | 3/2005 | Mathews et al. |
| 6,910,017 B1 | 6/2005 | Woo et al. |
| 6,963,854 B1 | 11/2005 | Boyd et al. |
| 7,085,734 B2 | 8/2006 | Grant et al. |
| 7,110,956 B1 | 9/2006 | Drake et al. |
| 7,133,848 B2 | 11/2006 | Phillips et al. |
| 7,197,474 B1 | 3/2007 | Kitts |
| 7,315,842 B1 | 1/2008 | Wang |
| 7,346,485 B2 | 3/2008 | Crowe et al. |
| 7,349,878 B1 | 3/2008 | Makivic |
| 7,398,221 B1 | 7/2008 | Bensoussan et al. |
| 7,574,394 B2 | 8/2009 | Chorna et al. |
| 7,627,494 B2 | 12/2009 | Mathews et al. |
| 7,627,495 B2 | 12/2009 | Mathews et al. |
| 2001/0041996 A1 | 11/2001 | Eder |
| 2002/0010667 A1 | 1/2002 | Kant et al. |
| 2002/0116348 A1 | 8/2002 | Phillips et al. |
| 2002/0143604 A1 | 10/2002 | Cox et al. |
| 2003/0014337 A1 | 1/2003 | Mathews et al. |
| 2003/0033191 A1 | 2/2003 | Davies et al. |
| 2003/0078870 A1 | 4/2003 | Datar et al. |
| 2003/0115128 A1 | 6/2003 | Lange et al. |
| 2003/0144897 A1 | 7/2003 | Burruss et al. |
| 2003/0236738 A1 | 12/2003 | Lange et al. |
| 2004/0068455 A1 | 4/2004 | Jacobus et al. |
| 2004/0098327 A1 | 5/2004 | Seaman |
| 2004/0128221 A1 | 7/2004 | Pandher |
| 2004/0249642 A1 | 12/2004 | Mathews et al. |
| 2005/0102213 A1 | 5/2005 | Savasoglu et al. |
| 2005/0125318 A1 | 6/2005 | Jameson |
| 2006/0253355 A1 | 11/2006 | Shalen |
| 2007/0011065 A1 | 1/2007 | Sreenivasan et al. |
| 2007/0022031 A1 | 1/2007 | Sponholtz et al. |
| 2007/0050282 A1 | 3/2007 | Chen et al. |
| 2007/0106576 A1 | 5/2007 | Jung et al. |
| 2007/0112661 A1 | 5/2007 | Mathews |
| 2007/0150390 A1 | 6/2007 | Mathews et al. |
| 2007/0150391 A1 | 6/2007 | Mathews et al. |
| 2007/0150392 A1 | 6/2007 | Mathews et al. |
| 2007/0150393 A1 | 6/2007 | Mathews et al. |
| 2007/0150394 A1 | 6/2007 | Mathews et al. |
| 2007/0150395 A1 | 6/2007 | Nakamoto et al. |
| 2007/0162376 A1 | 7/2007 | Mathews et al. |
| 2007/0299753 A1 | 12/2007 | Averbuch et al. |
| 2008/0015871 A1 | 1/2008 | Eder |
| 2008/0109341 A1 | 5/2008 | Stiff et al. |
| 2008/0147568 A1 | 6/2008 | Wang |
| 2008/0167984 A1 | 7/2008 | Courey et al. |
| 2008/0208678 A1 | 8/2008 | Walser et al. |
| 2008/0228605 A1 | 9/2008 | Wang |
| 2008/0288394 A1 | 11/2008 | Eder |
| 2009/0030822 A1 | 1/2009 | Cresswell |
| 2009/0043604 A1 | 2/2009 | Jung et al. |
| 2009/0043683 A1 | 2/2009 | Jung et al. |
| 2009/0099955 A1 | 4/2009 | Peters et al. |

OTHER PUBLICATIONS

Ray Nelson; Risk Analysis Using @RISK® and Crystal Ball®; *Crystal Bane; Oracle of IIF*; Dec. 2000; pp. 8-11.

John M. Charnes; *Using Simulation for Option Pricing*; Dec. 2000; pp. 151-157; *Proceedings of the 2000 Winter Simulation Conference*, Orlando, Florida.

*Risk Analysis Overview—What is Risk?*; Available at <http://www.decisioneering.com/risk-analysis-print.html> (visited Feb. 19, 2002).

*Real Options with Monte Carlo Simulation*; Available at <http://www.puc-rio.br/marco.ind/monte-carlo.html> (visited Feb. 25, 2002).

*Cone of Uncertainty*; Available at <http://www.real-options.com/cou.html> (visited Oct. 11, 2002).

Weston Copeland; *Managerial Finance*; 1990; pp. 481-487, 406-407, 642 (10 pages); 9$^{th}$ Edition; ISBN 0 03 0558832.

Alan Shapiro; *Modern Corporate Finance*; 1990; pp. 438, 261; ISBN 002409530-3.

Felstead, "A Mathematical Approach to Cost Minimization of Satcom Systems", 1996, IEEE, pp. 352-356.

Morrison, "Life Cycle Approach to New Product Forecasting", Summer 1995, *The Journal of Business Forecasting Methods & Systems*, 14, 2, ABI/INFORM Global, p. 3.

Eskin, "Dynamic Forecast of New Product Demand Using a Depth of Repeat Model", May 1973, *JMR Journal of Marketing Research*, 10, 0000002, AB/INFORM Global, p. 115.

Bassin, "The Logistic Curve—another approach to new product forecasting", Fall 1991, *The Journal of Business Forecasting Methods & Systems*, 10, 3, ABI/INFORM Global, p. 14.

Paszko et al., "Product Life Cycles and Profitability", Summer 1989, *The Journal of Business Forecasting Methods & Systems*, 8, 2; ABI/INFORM Global, p. 26.

Nelson, "The Product Life Cycle of Engineered Metals: a comparative analysis of the application of product life cycle theory", Spring 1992, *The Journal of Business & Industrial Marketing*, 7, 2, ABI/INFORM, Global, p. 5.

Curry, "FALCCM-H: Functional Avionics Life Cycle Cost Model for Hardware", © 1993, IEEE, pp. 950-953.

Xie et al., "Probabilistic Design Optimization of Aircraft Structures with Reliability, Manufacturability, and Cost Constraints", Apr. 7-10, 2003, 44$^{th}$ AIAA/ASME/ASCE/AHS Structures, Structural Dynamics, and Materials Conference, Norfolk, VA, p. 1.

Marx et al., "Knowledge-based manufacturing and structural design for a high speed civil transport", 1994, 1$^{st}$ Industry / Academy Symposium on Research for Future Supersonic and Hypersonic Vehicles, Greensboro, NC pp. 1-6.

Schrage, "Technology for Rotorcraft Affordability Through Integrated Product/Process Development (IPPD)", 1999, American Helicopter Society 55$^{th}$ Annual Forum, Montreal, Canada, pp. 1-19.

Kamath et al., T.P.M. (2002) A Bayesian approach to a dynamic inventory model under an unknown demand distribution. Computers & Operations Research, v. 29, pp. 403-422.

Hirschleifer (1980) Price Theory and Applications. Prentice-Hall: New York, pp. 126-151.

Morris (1992) Market Oriented Pricing. Quarom Books: New York, pp. 172-173.

Evans and Berman (1992). Marketing. Macmillan: New York. Chapter 18: Overview of Price Planning, pp. 526-547.

Berry et al., Automobile Prices in Market Equilibria. Econometrica, vol. 63, No. 4 (Jul. 1995), pp. 841-890.

Monroe, (1978) Models for Pricing Decisions, *Journal of Marketing Research*, vol. XV (August), pp. 413-428.

Urban et al., (1968) A New Product Analysis and Decision Model, *Management Science*, vol. 14, No. 8 (April), pp. B490-B519.

Yang et al. (2003) Bayesian Analysis of Simultaneous Demand and Supply, Quantitative Marketing and Economics, vol. 1, pp. 251-275.

Largent, "A probabilistic risk management based process for planning and management of technology development", PhD Dissertation Georgia Tech Aerospace Engineering, Mar. 2003, downloaded Sep. 3, 2008 [retrieved from http://smartech.gatech.edu/handle/1853/12168], pp. 1-79, 210-271.

International Search Report dated Nov. 19, 2008 for International Application No. PCT/US04/17258.

Cortazar et al., "Monte Carlo Evaluation Model of an Undeveloped Oil Field", *Journal of Energy Finance & Development*, vol. 3, No. 1, pp. 73-84. Available online Jan. 13, 1998. ISSN: 1085-743.

Charnes, John M., "Using Simulation for Option Pricing", The University of Kansas School of Business, Dec. 13, 2000, Presented at 2000 Winter Simulation Conference, Dec. 10-13, 2000, Wyndham Palace Resort and Spa, Orlando, FL, www.wintersim.org, pp. 151-157.

MacMillan, Fional, "Risk, Uncertainty and Investment Decision-Making in the Upstream Oil and Gas Industry", MA Hons (University of Aberdeen), Oct. 2000, A thesis presented for the degree of Ph.D. at the University of Aberdeen.

Longstaff, et al., "Valuing American Options by Simulation: A Simple Least-Squares Approach", Anderson Graduate School of

(56) References Cited

OTHER PUBLICATIONS

Management, eScholarship Repository, University of California, http://repositories.cdlib.org/anderson/fin/1-01, 2001.

Breeden et al., "Prices of State Contingent Claims Implicit in Options Prices", *Journal of Business*, vol. 51, No. 4, pp. 621-651 (Oct. 1978).

Real Options :: Managing Strategic Investment in an Uncertain World [online] [retrieved Mar. 29, 2013]. Retrieved from the Internet: <URL: http://www.real-options.com/>. (dated 2004) 1 page.

Risk Analysis Overview, Oracle (2008) 9 pages.

Cone of Certainty [online] [retrieved Oct. 11, 2012]. Retrieved form the Internet: <URL: http://www.real-options.com/cou.html>. (undated) 2 pages.

SYSTEMS, METHODS AND COMPUTER PROGRAM PRODUCTS FOR MODELING UNCERTAIN FUTURE BENEFITS

CROSS REFERENCE TO RELATED APPLICATION

This application is a divisional of and claims priority to U.S. application Ser. No. 10/453,396, filed Jun. 3, 2003, the entire contents of which are hereby incorporated herein by reference.

FIELD OF THE INVENTION

The present invention relates generally to systems, methods and computer program products for modeling future benefits and, more particularly, to systems, methods and computer program products for modeling the future benefits over time where the benefits are subject to uncertainty.

BACKGROUND OF THE INVENTION

In many industries, decisions that have future consequences generally attempt to account for an amount of uncertainty in the future consequence. For example, when manufacturers decide whether to start a project for the development, manufacture and sale of a good, those manufacturers try to account for future benefits associated with the good, such as future profits or revenues generated by the good, and/or units of the good produced. For example, the future revenues generated by a good can depend in large part on a number of factors, including an amount of uncertainty that can result in those future revenues actually being represented over a range of possible values.

Traditionally, manufacturers have not been capable of reliably quantifying a forecast of future revenues for projects when a significant amount of uncertainty exists. In this regard, techniques such as the price path formulation associated with Brownian motion and lattice techniques, have been developed to model uncertainty, sometimes referred to as a "cone of uncertainty," with the path of future revenues modeled within the cone. Whereas such techniques adequately model uncertainty and future revenues, they have shortcomings in certain, but crucial, applications. For example, such techniques are typically unable to easily incorporate changes in uncertainty over time. Also, for example, such techniques are typically unable to easily account for contingent decisions that may occur during a given time period.

Both Brownian motion and lattice techniques typically operate by defining a constant amount of uncertainty and a constant amount of growth in revenues over a period of time, and do not account for contingencies such as internal and/or external activities or endeavors. It will be appreciated, however, that in many actual instances, uncertainty and/or growth rate can vary from time segment to time segment over a period of time. In addition, in many actual instances, uncertainty and/or growth rate can take into account internal and external activities or endeavors, which may or may not be conditional, such as the payout of a dividend, entry of a competitor into the market, change in governmental regulations, or agreement for revenue sharing. Thus, conventional techniques such as the Brownian motion and lattice techniques, do not provide adequate flexibility to thereby accurately model uncertainty for future revenues.

SUMMARY OF THE INVENTION

In light of the foregoing background, embodiments of the present invention provide systems, methods and computer program products for modeling future benefits over a period of time, such as future profits, revenues, units or the like, where the future benefits are subject to an amount of growth and/or uncertainty that can vary. The systems, methods and computer program products of embodiments of the present invention permit rapid modeling of uncertain benefits of a project with minimal inputs, and allow the uncertainty of the benefits to be tailored according to forecasted business conditions, which can change over the course of time. The systems, methods and computer program products of embodiments of the present invention also allow for visualization of the benefits within bounds of uncertainty, referred to herein as the "cone of uncertainty." By modeling the uncertain future benefits, the systems, methods and computer program products of embodiments of the present invention are also capable of generating a business case based upon the modeled future benefits.

According to one aspect of the present invention, a method is provided for modeling future benefits. The method begins by determining a benefit distribution for each time segment of a period of time based upon a growth rate and an uncertainty for the respective time segment. In this regard, the benefit distribution can be determined for at least one time segment further based upon execution of a contingent activity, such as a contingent dividend payment paid, at at least one previous time segment. Then, after determining the benefit distributions, a benefit value is selected for each time segment by randomly selecting each benefit value based upon a respective benefit distribution to thereby model future benefits of the good over the period of time. Before determining the benefit distribution, a growth rate associated with the benefit can be defined for each time segment. Advantageously, the growth rate for each time segment can be defined such that the growth rate for at least one time segment differs from the growth rate of at least one other time segment. In addition to defining the growth rate, an uncertainty associated with the benefit can be determined for each time segment. In this regard, like the growth rate, the uncertainty for each time segment can advantageously be defined such that the uncertainty for at least one time segment differs from the uncertainty of at least one other time segment. Further, a growth rate for each time segment can be defined independent of an uncertainty for the respective time segment, and vice versa.

In one embodiment, the method includes repeatedly selecting a different benefit value for each time segment to thereby repeatedly model future benefits. Also, in one embodiment, the method further includes modeling bounds of uncertainty of future benefits. In this embodiment, the bounds of uncertainty can be modeled by determining a mean value and standard deviation associated with the benefit for each time segment, and modeling an upper and lower bound of uncertainty for each time segment based upon the mean value and standard deviation to thereby model the bounds of uncertainty.

More particularly as to modeling the bounds of uncertainty, another aspect of the present invention provides a method of modeling bounds of uncertainty of future benefits. The method begins by determining a mean value and standard deviation of the good for each time segment, where the mean value is determined based upon a growth rate of the good for the respective time segment, and the standard deviation is determined based upon an uncertainty for the good for the respective time segment. In this regard, before determining the mean value and standard deviation, a growth rate can be defined, and an uncertainty determined, for each time segment, as such may be defined and determined according to above. In one embodiment, the mean value for at least one time segment of the period of time is determined further based upon execution of a contingent activity, such as payment of a dividend, at at least one previous time segment.

Finally, an upper and lower bound of uncertainty are modeled based upon the mean value and standard deviation for each time segment to thereby model the bounds of uncertainty. More particularly, the method can further include normalizing the mean value for each time segment based upon the standard deviation and normalizing the standard deviation for each time segment based upon the mean value. In such instances, the upper and lower bound of uncertainty can be modeled for each time segment based upon the normalized mean value and normalized standard deviation. Also, the upper and lower bound of uncertainty can be modeled further based upon an inverse of a standard normal cumulative distribution, where the standard normal cumulative distribution is defined by a probability. In this regard, the upper and lower bound can be modeled by further selecting a lower probability associated with the lower bound and an upper probability associated with the upper bound. Advantageously, the lower probability can be selected higher than zero, and the higher probability can be selected higher probability lower than one.

In addition, according to various embodiments of the present invention, the future benefits and/or bounds of uncertainty are capable of being modeled with a processing element operating a spreadsheet software program. In such embodiments, the future benefit model and/or the upper and lower bounds of uncertainty can be presented on a display coupled to the processing element. More particularly, the future benefit model or upper and lower bounds of uncertainty can be presented as a plot of the selected future benefits or the upper and lower bounds, respectively, and associated time segments.

Systems and computer program products for modeling future benefits of a good are also provided. Therefore, embodiments of the present invention provide systems, methods and computer program products for modeling future benefits of a good over a period of time, where the future benefits are subject to an amount of growth and uncertainty that can vary. In this regard, the systems, methods and computer program products of embodiments of the present invention allow the uncertainty of the benefits to be tailored according to forecasted business conditions, which can change over the course of time.

BRIEF DESCRIPTION OF THE DRAWINGS

Figure 1:
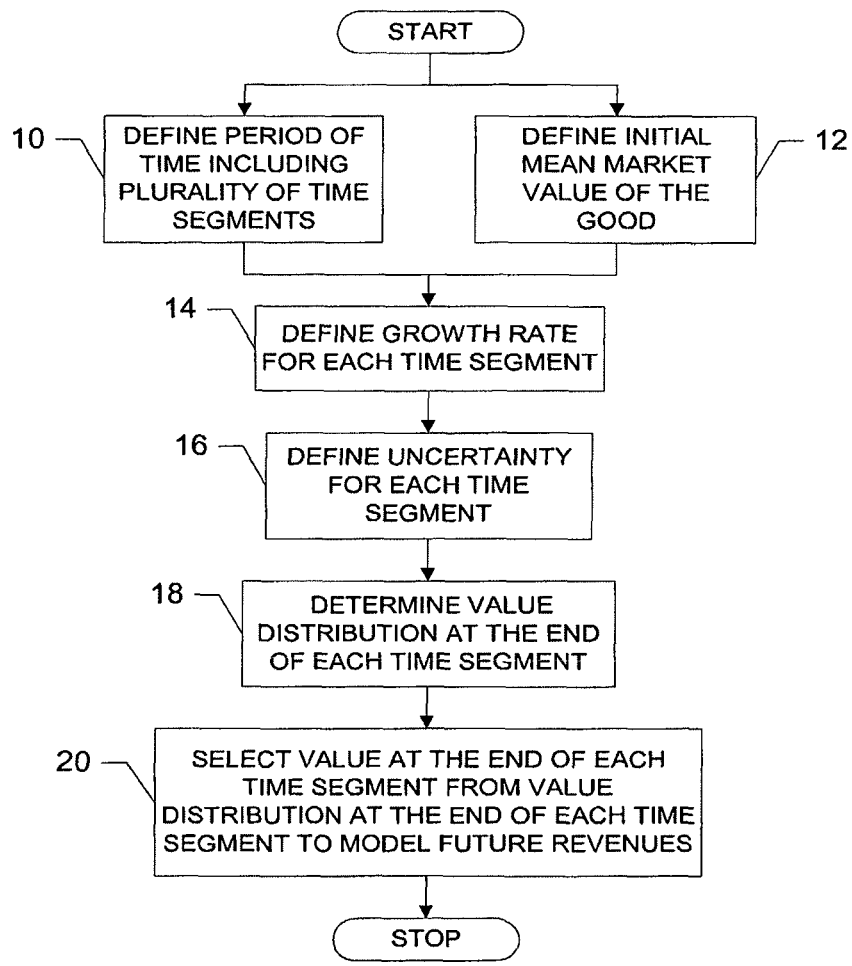
Figure 2:
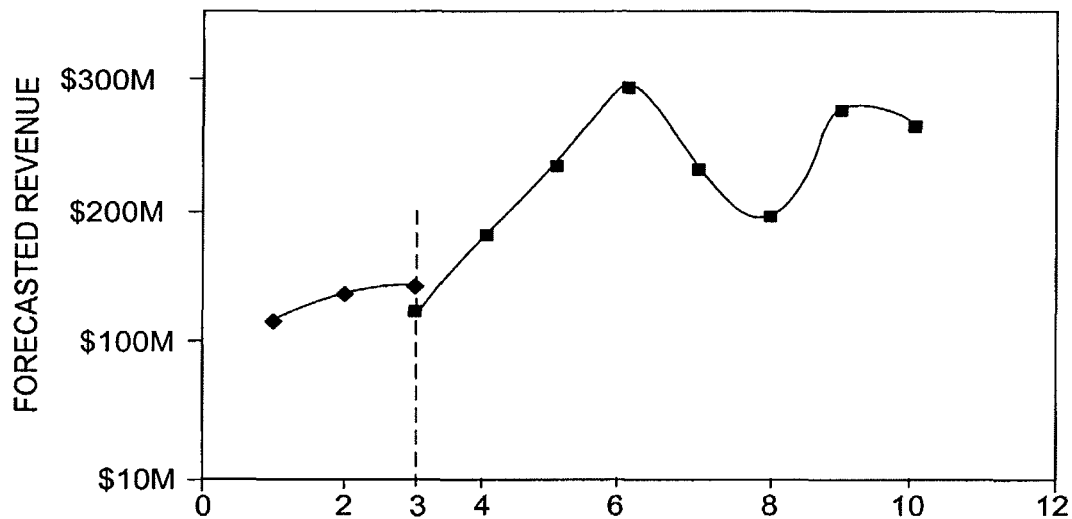
Figure 3:
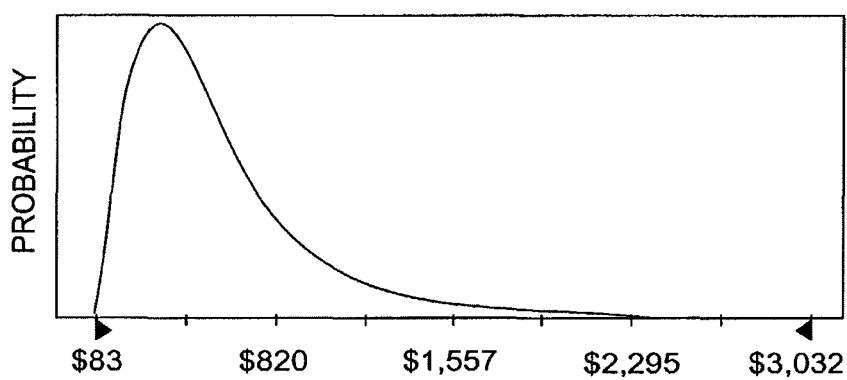
Figure 4:
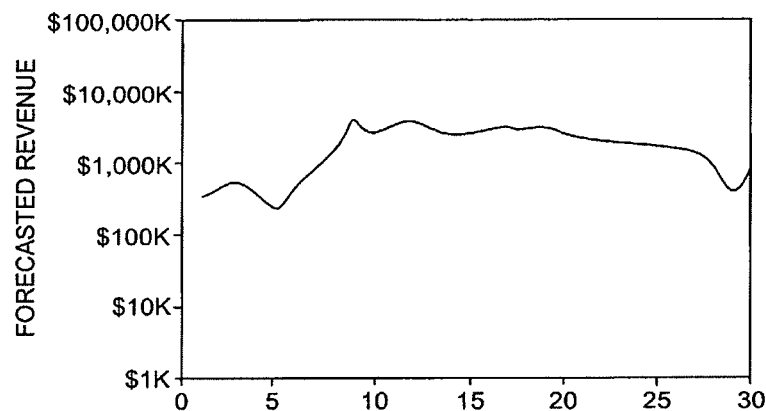
Figure 6:
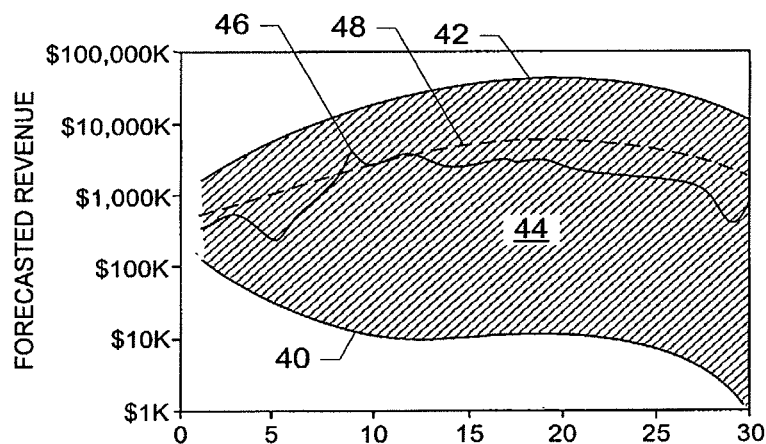
Figure 5:
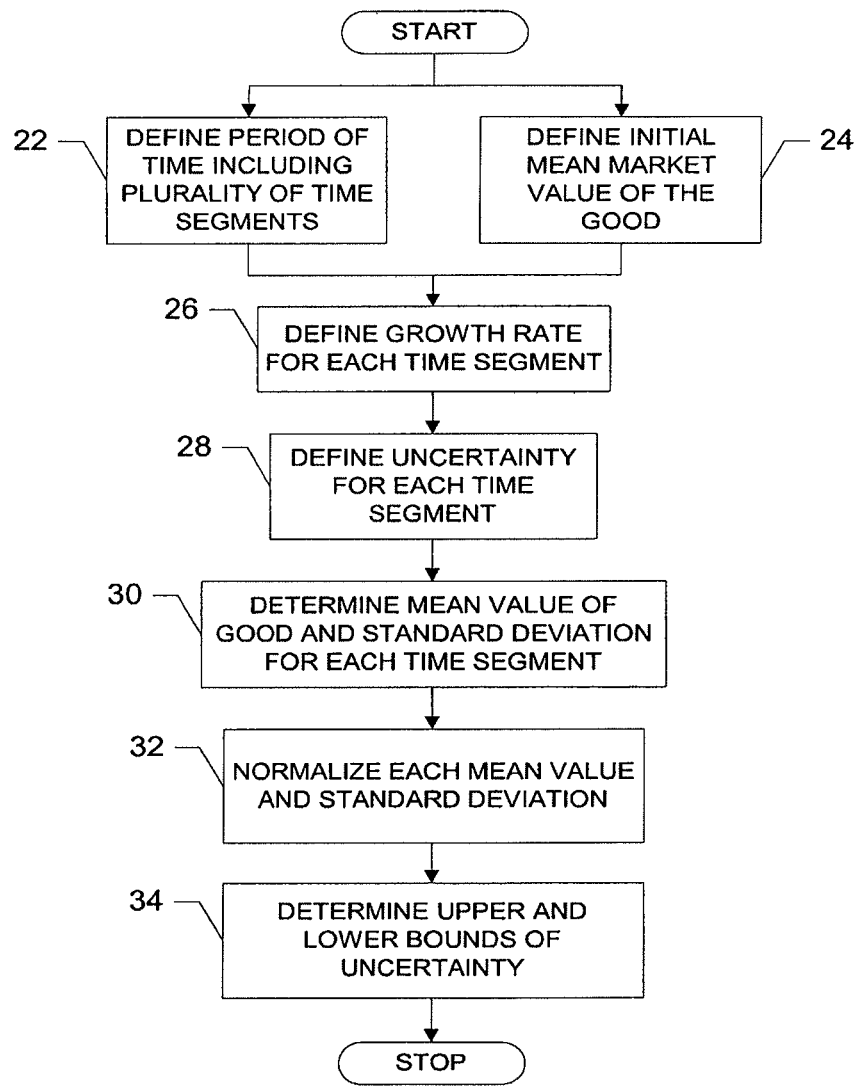
Figure 7:
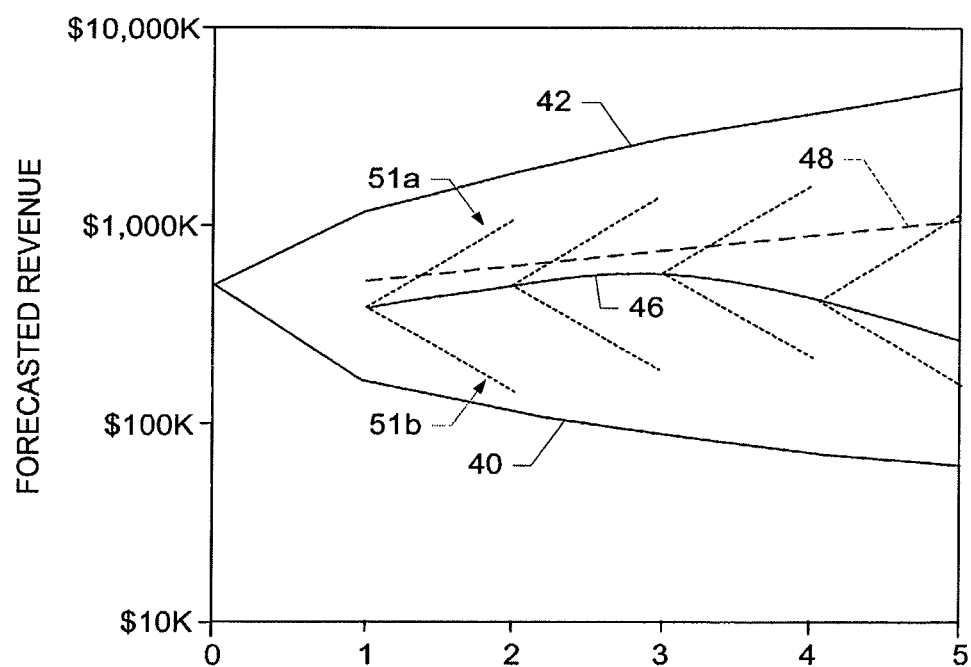
Figure 8:
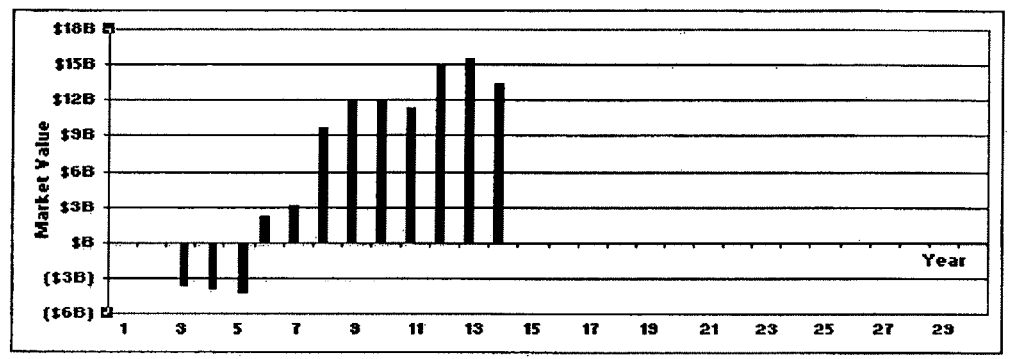
Figure 9A:
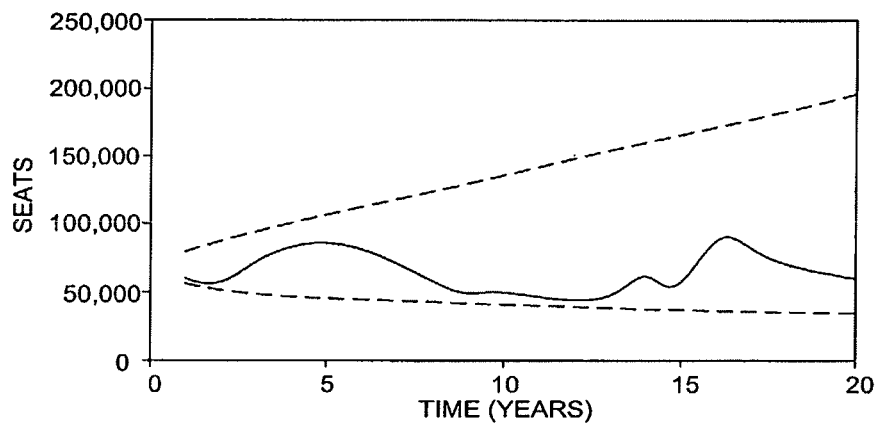
Figure 9B:
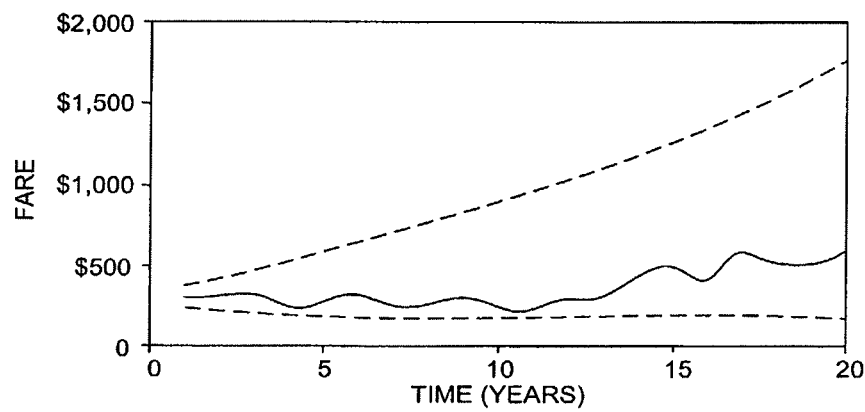
Figure 9C:
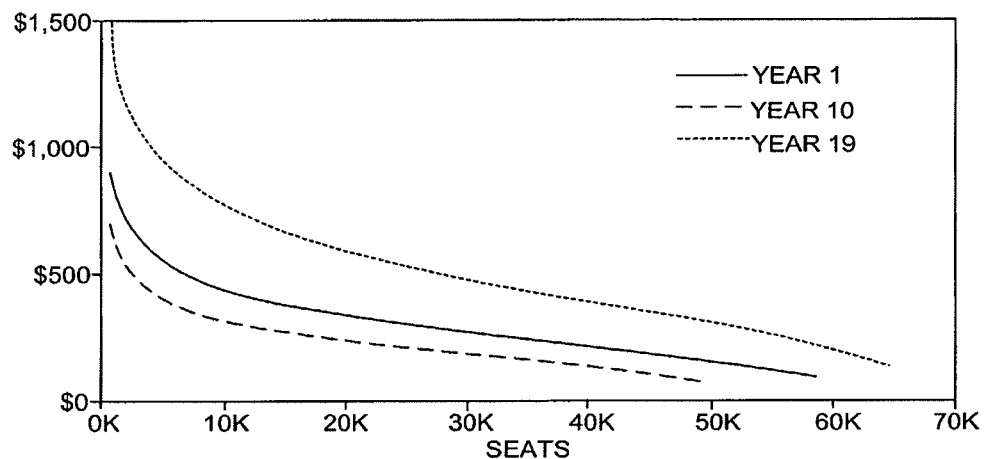

Having thus described the invention in general terms, reference will now be made to the accompanying drawings, which are not necessarily drawn to scale, and wherein:

FIG. 1 is a flow chart illustrating the operations performed by the system, method and computer program product of one embodiment of the present invention;

FIG. 2 is a graphical illustration of future benefits such being subject to a contingent activity, such as a dividend payout;

FIG. 3 is a graphical illustration of a revenue distribution for one time segment, according to one embodiment of the present invention;

FIG. 4 is a graphical plot of future revenues of a good as a function of time according to one embodiment of the present invention;

FIG. 5 is another flow chart illustrating the operations performed by the system, method and computer program product of one embodiment of the present invention;

FIG. 6 is a graphical plot of the upper and lower bounds of uncertainty plotted against the future revenues of FIG. 4 as well as the mean values of the good according to one embodiment of the present invention, where the upper and lower bounds, the future revenues and mean values are plotted as a function of time;

FIG. 7 is a graphical plot of the upper and lower bounds of uncertainty over all time segments and future revenues, along with upper and lower bounds of uncertainty for each time segment, according to one embodiment of the present invention;

FIG. 8 is a chart illustrating a business case created according to one embodiment of the present invention; and FIG. 9 is a schematic block diagram of the system of one embodiment of the present invention embodied by a computer.

Figure 10:
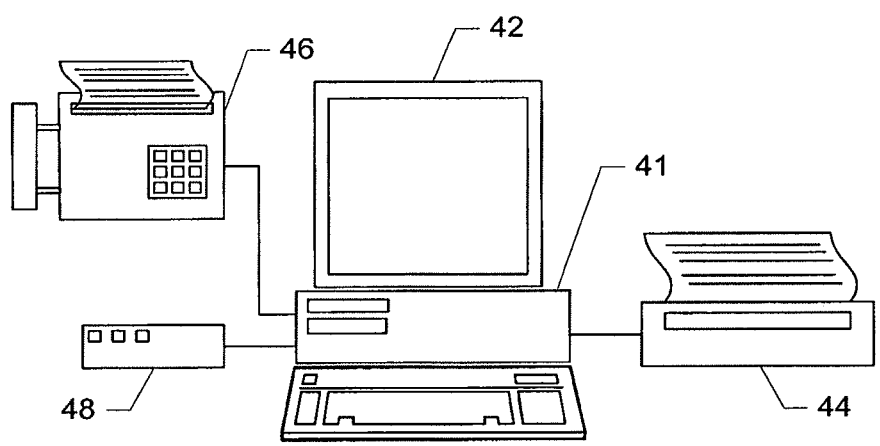

FIG. 10 is a schematic representation of a computer that may be specifically configured in accordance with an example embodiment of the present disclosure.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

According to embodiments of the present invention, a future benefit is modeled over a period of time, where the period of time includes a plurality of time segments that each begin and end with a point in time. The benefit can be any of a number of different values subject to an amount of future uncertainty and growth. For example, the benefit can comprise future numbers of units of a good produced. Alternatively, for example, the benefit can comprise future profits in the sale of a good. As described herein, the benefit comprises future revenues of a good. It should be understood, however, that the description herein of modeling future revenues of a good is but one example of a benefit capable of being modeled according to embodiments of the present invention, and in no way should be taken to limit the scope of the present invention.

Referring to FIG. 1, a method of modeling future revenues of a good (benefits) over a period of time according to one embodiment of the present invention begins by defining the period of time, as shown in block 10. In this regard, the period of time can begin at t=0 and extend to t=T. The period of time can be divided into a number of different time segments in any of a number of different manners. In one embodiment, the time period T is defined such that each time segment can be represented as an integer divisor of T, i.e., t=0, 1, 2, . . . T. Thus, for example, the period of time can be defined as a number of years (i.e., T=30), where the period of time is divided into a number of one-year time segments which, including the original time t=0, totals the number of years plus one time segment (i.e., t=0, 1, 2, . . . 30). As used herein, each time segment extends from point in time t to point in time t+1 (presuming the time segment is an integer divisor of T), and is defined by the beginning point in time t. Thus, time segment t=1 extends from point in time t=1 to point in time t=2. Similarly, time segment t=2 extends from points t=2 to t=3.

Either before, during or after defining the time period, the mean market value of the good is defined for time segment t=0, as shown in block 12. After defining the time period, then, the growth rate of the good can be defined over the time period, as shown in block 14. The mean market value of the good can be defined in any of a number of different manners. For example, in one embodiment, the mean market value can be defined as the maximum gross profitability in a forecasted market including an optimal number of units of the good purchased for an optimal price. For a description of one technique of determining the maximum gross profitability, see U.S. patent application Ser. No. 10/453,727, entitled: Systems, Methods and Computer Program Products for Modeling Demand and Associated Profitability of A Good, filed Jun. 3, 2003, the contents of which are hereby incorporated by reference in its entirety.

The growth rate can be determined according to any of a number of different techniques, such as according to market forecasts. Advantageously, and in contrast to the price path formulation associated with the Black-Scholes method, the growth rate can vary from time segment to time segment over the time period, typically beginning at time segment t=1. Thus, for example, the growth rate for time segment t=1 can equal 20%, while the growth rate for time segment t=2 can equal 20% or, alternatively, any value greater than or less than 20%.

Either during or after defining the growth rate, the uncertainty in the market including the good can be determined for each time segment, typically beginning with t=1, as shown in block 16. In this regard, the uncertainty can be determined according to any of a number of different techniques. In one embodiment, for example, the uncertainty is determined based upon a model of returns, or growth rate, versus risk, or uncertainty. More particularly, in one embodiment for example, the returns are modeled from two risk values and associated return values, as such may be determined by an estimator or the like.

Then, assuming a typical linear relationship between risk and return, the risk can be modeled as a linear function of returns based upon the two risk values and associated return values. For example, according to one embodiment, two risk values may comprise 20% and 30%, with associated return values comprising 10.0% and 12.5%, respectively. With such values, risk can be modeled as a linear function of return as follows:

Risk(Return)=4×(Return−5)

where return and risk are expressed as percentages. For a further description of modeling risk as a function of returns, see U.S. patent application Ser. No. 10/453,395, entitled: Systems, Methods and Computer Program Products for Modeling Cost and Associated Revenue for A Good Based Upon at Least One Technology Maturity Level, filed Jun. 3, 2003, the contents of which is incorporated by reference in its entirety. For an example of the uncertainty associated with various growth rates, as such may have been determined according to the above, see Table 1.

TABLE 1

| Growth Rate | Uncertainty |
|---|---|
| 10.0% | 20% |
| 12.5% | 30% |
| 15.0% | 40% |
| 17.5% | 50% |
| 20.0% | 60% |
| 22.5% | 70% |
| 25.0% | 80% |
| 27.5% | 90% |
| 30.0% | 100% |

It should be noted that whereas a linear relationship between risk and return has been assumed above, risk and return need not have such a relationship. In this regard, a linear relationship between risk and return is approximately reflective of current the capital market relationship of risk and return, embodied in the well-known Capital Asset Pricing Model (CAPM) theory. In many instances, however, risk and return may not have a linear relationship. For example, some goods may have a high projected return with corresponding low risk when compared to CAPM.

After the growth rate has been defined and the uncertainty has been determined for each time segment in the time period, the revenue for each time segment can be modeled based upon a revenue distribution for each time segment. Each revenue distribution can be determined in any of a number of different manners but, in one embodiment, each revenue distribution can determined based upon the standard deviation in time for the respective time segment and the mean value of the good for the time segment, as shown in block 18. And whereas the mean value of the good for each time segment can be determined in any of a number of different manners, in one embodiment the mean value of the good for each time segment is determined as follows:

$$\mu_t = \left(1 + \frac{GR_t}{100}\right) \times \mu_{t-1} \quad (2)$$

In equation (1), $\mu_t$ represents the mean value of the good for the current time segment, $\mu_{t-1}$ represents the mean value of the good at the immediately preceding time segment, and $GR_t$ represents the growth rate for the current time segment, where the growth rate is expressed in terms of a percentage.

Like the mean value of the good for each time segment, the standard deviation for each time segment can be determined in any of a number of different manners. In one embodiment, for example, the standard deviation can be determined as follows:

$$\sigma_t = \mu_t \times \sqrt{e^{\sigma_{avgt}^2 \times t} - 1} \quad (2)$$

In equation (2), t represents the current time segment, and $\sigma_t$ represents the standard deviation for the current time segment. Also in equation (2), $\sigma_{avgt}$ represents a running average of the uncertainty values from t=1 to the current time segment t, and can be determined, for example, as follows:

$$\sigma_{avgt} = \sqrt{\frac{\sum_{i=1}^{t} U_i^2}{t}} \quad (3)$$

where $U_i$ represents the uncertainty for the ith time segment, and i=1, 2, . . . t. For an example of the values of the growth rate, mean value of the good, uncertainty and standard deviation for each time segment in a period of 30 years, where each time segment represents one year, see Table 2 below.

TABLE 2

| Time (t) | Growth Rate ($GR_t$) | Mean ($\mu_t$) | Uncertainty($U_i$) | Std. Dev. ($\sigma_t$) |
|---|---|---|---|---|
| 0 | — | $500 | — | — |
| 1 | 20% | $600 | 60% | $ 395 |
| 2 | 20% | $720 | 60% | $ 739 |
| 3 | 20% | $864 | 60% | $1,205 |

TABLE 2-continued

| Time (t) | Growth Rate (GR$_t$) | Mean (μ$_t$) | Uncertainty(U$_i$) | Std. Dev. (σ$_t$) |
|---|---|---|---|---|
| 4 | 20% | $1,037 | 60% | $ 1,861 |
| 5 | 20% | $1,244 | 60% | $ 2,796 |
| 6 | 20% | $1,493 | 60% | $ 4,135 |
| 7 | 20% | $1,792 | 60% | $ 6,057 |
| 8 | 20% | $2,150 | 60% | $ 8,816 |
| 9 | 20% | $2,580 | 60% | $12,779 |
| 10 | 20% | $3,096 | 60% | $18,471 |
| 11 | 18% | $3,653 | 52% | $25,034 |
| 12 | 16% | $4,238 | 44% | $32,051 |
| 13 | 14% | $4,831 | 36% | $39,026 |
| 14 | 12% | $5,411 | 28% | $45,483 |
| 15 | 10% | $5,952 | 20% | $51,056 |
| 16 | 8% | $6,428 | 20% | $56,269 |
| 17 | 6% | $6,813 | 20% | $60,866 |
| 18 | 4% | $7,086 | 20% | $64,595 |
| 19 | 2% | $7,228 | 20% | $67,234 |
| 20 | 0% | $7,228 | 20% | $68,608 |
| 21 | −2% | $7,083 | 20% | $68,609 |
| 22 | −4% | $6,800 | 20% | $67,209 |
| 23 | −6% | $6,392 | 20% | $64,466 |
| 24 | −8% | $5,880 | 20% | $60,518 |
| 25 | −10% | $5,292 | 20% | $55,577 |
| 26 | −12% | $4,657 | 28% | $50,880 |
| 27 | −14% | $4,005 | 36% | $46,710 |
| 28 | −16% | $3,364 | 44% | $43,253 |
| 29 | −18% | $2,759 | 52% | $40,631 |
| 30 | −20% | $2,207 | 60% | $38,942 |

As will be appreciated, future benefits such as revenues can be subject to a contingent activity, or event, which can impact the future benefits (mean and uncertainty values) for subsequent time segments. For example, revenues over a time segment can be subject to a contingent dividend payment, which diverts of a portion of revenues, as shown in FIG. 2 at time t=3. By diverting a portion of the revenues, the mean value of the good (i.e., $\mu_{t-1}$) is lowered in the determination of the mean value over a subsequent time segment (i.e., $\mu_t$). An analogous situation, for example, is a contingent revenue sharing agreement with a supplier, or the impact of a competitor entering the market and diverting revenues. As will also be appreciated, the contingent activity can itself be represented as a probability distribution. For example, the contingent activity comprising payment of a dividend can be represented by a value of the dividend if executed, and an associated probability of the dividend being executed at the respective value. Thus, as the mean value and standard deviation are determined, any contingent activities to which the revenues for the respective time segment are subject can be accounted for to adjust the growth rate, uncertainty, mean value and/or standard deviation accordingly. By linking each time segment to the outcome of the prior time segment, embodiments of the present invention can advantageously provide the flexibility to incorporate contingent activities or endeavors or decisions that may occur at the transition between time segments.

After determining the mean value of the good and standard deviation over each time segment, a revenue distribution can be determined for each time segment by defining each revenue distribution according to the respective mean value of the good and standard deviation. The revenue distribution can be represented as any of a number of different types of distributions but, in one embodiment, the revenue distribution is defined as a log normal distribution. In this regard, FIG. 3 illustrates the revenue distribution defined at time t=1 for the example in Table 2.

Thus, to model the future revenues for the good, a revenue value for each time segment is selected from the revenue distribution for the respective time segment, as shown in block 20 of FIG. 1. Advantageously, the revenue value can be selected according to a method for randomly selecting the revenue value, such as the Monte Carlo method. As known to those skilled in the art, the Monte Carlo method is a method of randomly generating values for uncertain variables to simulate a model. In this regard, the Monte Carlo method is applied to the revenue distributions to select a revenue value for each time segment. The model of future revenues can be represented in any one of a number of manners but, in one embodiment, the model of future revenues is represented by plotting the revenue values for the time segments over the period of time, such as is shown in FIG. 4 where the revenue distributions are based upon the mean values of the good and standard deviations of Table 2. And as described below, by repeatedly selecting different revenue values for one or more time segments, corresponding future revenues for the good can be modeled for each selected set of revenue values.

As will be appreciated, the values (e.g., mean and standard deviation) determined above for each time segment can be determined in any manner and any order. For example, each respective value for all time segments in time be determined at one time, with the remaining values for all time segments determined thereafter. Alternatively, all values for each time segment in time can be determined at one time, with all the values for the remaining time segments determined thereafter. In other terms, the values can be determined on a value-by-value basis or on a time segment-by-time segment basis, for example.

In addition to modeling uncertain revenues for a good, aspects of the present invention are also capable of modeling the uncertain revenues within bounds of uncertainty, referred to herein as the "cone of uncertainty." It will be appreciated, however, that at the lowest bounds of possible revenues, goods are typically dropped or re-scoped into different goods. Similarly, at the highest bounds of possible revenues, several factors, such as competitors entering the market and reaching capacity of the market, act to limit the revenues. In this regard, whereas the cone can be determined to define the range of possible revenues for each time segment, in one embodiment the cone is determined by truncating the lowest and highest bounds, such as by truncating the each bound by a predefined percentage (e.g., 2.5%), so that the cone is determined to define the rage of most likely revenues for each time segment.

With reference now to FIG. 5, the cone of uncertainty, or lower and upper bounds, can be determined by initially, as before, defining the period of time, defining the mean market value of the good is defined for time t=0, defining the growth rate of the good over the time period, and determining the uncertainty in the market including the good for each time segment, as shown in blocks 22, 24, 26 and 28, respectively. Then, the mean value of the good μ and the standard deviation σ for each time segment t within the time period can be determined, such as is described above and shown in block 30. It will be appreciated, however, that at the inception of the good (i.e., t=0), no revenues will be generated and, as such, the lower and upper bounds at t=0 will typically be zero. After determining the mean value of the good and the standard deviation for each time segment, the mean and standard deviations can be normalized based on one another, as shown in block 32. The mean and standard deviations can be normalized in any of a number of different manners, but in one embodiment, the mean value of the good for each time segment can be normalized to $\mu_{log\,t}$ as follows:

$$\mu_{\log t} = -\frac{1}{2} \times \ln(((\sigma_t/\mu_t)^2 + 1)/\mu_t^2) \quad (4)$$

Similarly, in one embodiment, the standard deviation for each time segment can be normalized to $\sigma_{\log t}$ as follows:

$$\sigma_{\log t} = \sqrt{\ln((\sigma_t/\mu_t)^2 + 1)} \quad (5)$$

After normalizing the mean value of the good and the standard deviation for each time segment, the lower and upper bounds of uncertainty, defining the cone of uncertainty, can be determined, as shown in block 34. In this regard, the bounds can be determined based upon the normalized mean values and standard deviations. Further, the bounds can be determined based upon an inverse of a standard normal cumulative distribution, where the distribution is defined by a probability and has a mean of zero and a standard deviation of one. The lower and upper bounds can be defined in any of a number of different manners, but in one embodiment, the lower and upper bounds can be determined according to the following equations (6) and (7), respectively:

$$L\text{Bound}_t = e^{\mu_{\log t} + \sigma_{\log t} \times NormsInv(p_l)} \quad (6)$$

$$U\text{Bound}_t = e^{\mu_{\log t} + \sigma_{\log t} \times NormsInv(p_u)} \quad (7)$$

In equations (6) and (7), NormsInv(p) represents the inverse of the standard normal cumulative distribution for a defined probability, or percentage p.

As the bounds define the lower and upper bounds of revenues, the lower percentage $p_l$ can be set at 0% (i.e., probability of 0.0) for the lower bound, and the upper percentage $p_u$ can be set at 100% (i.e., probability of 1.0) for the upper bound. But as indicated above, in one embodiment the bounds of the cone are truncated by a predefined percentage (or probability) so that the cone is determined to define the rage of most likely revenues for each time segment. As such, the lower percentage $p_l$ can be set at a value above 0%, such as at 2.5%. Similarly, the upper percentage $p_u$ can be set at a value below 100%, such as 97.5%. For an example of the lower and upper bounds, defined at 2.5% and 97.5%, respectively, and determined based upon the mean values of the good and standard deviations in the example of Table 2, see Table 3 below.

TABLE 3

| Time (t) | 2.5% Min | 97.5% Max |
|---|---|---|
| 0 | — | — |
| 1 | $155 | $ 1,624 |
| 2 | $ 95 | $ 2,650 |
| 3 | $ 66 | $ 3,860 |
| 4 | $ 48 | $ 5,302 |
| 5 | $ 36 | $ 7,015 |
| 6 | $ 28 | $ 9,037 |
| 7 | $ 23 | $11,409 |
| 8 | $ 18 | $14,177 |
| 9 | $ 15 | $17,386 |
| 10 | $ 12 | $21,091 |
| 11 | $ 11 | $24,935 |
| 12 | $ 11 | $28,880 |
| 13 | $ 11 | $32,848 |
| 14 | $ 11 | $36,722 |
| 15 | $ 12 | $40,350 |
| 16 | $ 12 | $43,528 |
| 17 | $ 12 | $46,081 |
| 18 | $ 12 | $47,861 |
| 19 | $ 12 | $48,748 |
| 20 | $ 12 | $48,675 |
| 21 | $ 11 | $47,626 |
| 22 | $ 10 | $45,645 |

TABLE 3-continued

| Time (t) | 2.5% Min | 97.5% Max |
|---|---|---|
| 23 | $9 | $42,831 |
| 24 | $8 | $39,333 |
| 25 | $7 | $35,332 |
| 26 | $6 | $30,970 |
| 27 | $4 | $26,444 |
| 28 | $3 | $21,946 |
| 29 | $2 | $17,648 |
| 30 | $1 | $13,695 |

The cone of uncertainty can be represented in any one of a number of manners. In one embodiment, shown in FIG. 6, the cone of uncertainty is represented by plotting the lower bounds (designated line 40) and the upper bounds (designated line 42) for the time segments over the period of time where, as shown, the bounds are determined based upon the mean values of the good and standard deviations of Table 2. The cone can then be defined as the cross-hatched region 44 between the lower and upper bounds, and can be plotted against the model of future revenues (designated line 46) as well as the mean values of the good (designated line 48). As shown, one or more of the time segments can have a revenue that exceeds the upper bound and, although not shown, one or more of the time segments can have a revenue below the lower bound. In this regard, it will be appreciated that the bounds define the range of most likely revenues and, as such, the bounds are defined to not include a number of possible revenue values.

Just as the upper and lower bounds of uncertainty can be modeled over all time segments, the upper and lower bounds of uncertainty can be modeled for each time segment. Referring now to FIG. 7, according to one embodiment, the bounds of uncertainty for time segment t (i.e., between point in time t and time t+1) can be modeled by first selecting a future revenue for point in time t, such as from the revenue distribution for time segment t, as described above. As will be appreciated, as the future revenue at time t has been selected, no uncertainty is associated with the revenues at time t. Therefore, the upper and lower bounds of uncertainty at time t appear, when plotted, as a point 49 at the selected value of revenues at time t.

From the future revenue at time t, a mean value at point in time t=t+1 can be determined, such as according to equation (1) above where $\mu_{t-1}$ represents the future revenue for time t, $\mu_t$ represents the mean value at time t=t+1, and $GR_t$ represents the growth rate for time t=t+1. After determining the mean value at time t=t+1, the standard deviation at time t=t+1 can be determined, such as according to equation (2) above, where $\sigma_t$ represents the standard deviation at time t=t+1, t represents the time at t=t+1, and $\sigma_{avgt}$ represents a running average of the uncertainty values from t=1 to time t=t+1 (see equation (3)). As can be seen, then, the mean and standard deviation values define a distribution. Thereafter, the upper and lower bounds of uncertainty at time t=t+1 can be determined, such as in a manner described above in conjunction with equations (4) through (7). As shown in FIG. 7, then, the upper and lower bounds at time t=t+1 appear as points 51a and 51b, respectively, at the respective point in time. The bounds of uncertainty between time t and time t=t+1 can then be modeled by connecting the bounds of uncertainty at time t (i.e., the selected revenue value at time t) with the bounds of uncertainty at time t=t+1. As shown, and as will be appreciated, at time progresses, the uncertainty associated with a future benefit, such as revenues, increases outwardly.

At this point it should be made clear that the model of uncertain future revenues up to this point has been tied to one forecasted revenue for each time segment selected according to a method for randomly selecting a predefined number of units of the good, such as the Monte Carlo method. As such, after modeling the future revenues including a selected revenue for each time segment, the method can then be repeated a plurality of times by selecting different forecasted revenues for each time segment. Then, if so desired, the forecasted revenues for each time segment can be organized into a distribution for the respective time segment. The distributions can then be defined, such as by a curve type and a mean and associated standard deviation.

From the distributions, then, a business case for the good can be created. For example, the business case can receive the distributions for the future revenue for each time segment. Based upon the distributions, then, the market value of the project can be determined and plotted over time, as shown in FIG. 8. As shown, the business case can plot the nonrecurring costs associated with the project (shown below zero for years three through five). Additionally, the business case can plot the profit associated with the project, which can be determined as described above. As described, the business case can be created from distributions organized from selecting different future revenues for the time segments by repeating the method a plurality of times. It will be appreciated, however, that the business case can be created from performing the method once to select one forecasted revenue for each time segment.

In addition to creating a business case, the method of the present invention can be performed to draw any of a number of different conclusions, and can additionally be utilized in conjunction with other similar methods to formulate a more complex financial modeling tool. For example, in one embodiment, a contingent claim can be valued and thereafter input into the model of uncertain future benefits, such as the mean value of the good for time segment t=0. Whereas the contingent claim can be valued in any of a number of different manners, in one embodiment, the contingent claim is valued by initially determining the present value distribution of contingent future benefits that is attributable to the exercise of a contingent claim. In this regard, the distribution of contingent future benefits can be discounted according to a first discount rate, such as the weighted average cost of capital (WACC). The present value of a contingent future investment required to exercise the contingent claim is also determined based upon another appropriate discount rate, such as a risk-free rate of discounting. An average of the difference between the present value distribution of contingent future benefits and the present value of the contingent future investment can be determined. For more information on such a method of valuing a contingent claim, see U.S. patent application Ser. No. 09/902,021 entitled: Systems, Methods and Computer Program Products for Performing A Generalized Contingent Claim Valuation, filed Jul. 10, 2001; and U.S. patent application Ser. No. 10/309,659 entitled: Systems, Methods and Computer Program Products for Performing A Contingent Claim Valuation, filed Dec. 4, 2002, the contents of both of which are hereby incorporated by reference in their entirety.

Therefore, embodiments of the present invention provide systems, methods and computer program products for modeling future revenues of a good over a period of time, where the future revenues are subject to an amount of growth and uncertainty that can vary. In this regard, the systems, methods and computer program products of embodiments of the present invention allow the uncertainty of the revenues to be tailored according to forecasted business conditions, which can change over the course of time. As such, embodiments of the present invention also allow for visualization of the revenues within bounds of uncertainty, referred to herein as the "cone of uncertainty."

As shown in FIG. 9, the system of the present invention is typically embodied by a processing element and an associated memory device, both of which are commonly comprised by a computer 41 or the like. In this regard, as indicated above, the method of embodiments of the present invention can be performed by the processing element manipulating data stored by the memory device with any one of a number of commercially available computer software programs. In one embodiment, the method can be performed with data that is capable of being manipulated and/or presented in spreadsheet form. For example, the method can be performed by the processing element manipulating data stored by the memory device with Excel, a spreadsheet software program distributed by the Microsoft Corporation of Redmond, Wash., including Crystal Ball, a Monte Carlo simulation software program distributed by Decisioneering, Inc. of Denver, Colo. The computer can include a display 42 for presenting information relative to performing embodiments of the method of the present invention, including the various distributions, models and/or conclusions as determined according to embodiments of the present invention. To plot information relative to performing embodiments of the method of the present invention, the computer can further include a printer 44.

Also, the computer 41 can include a means for locally or remotely transferring the information relative to performing embodiments of the method of the present invention. For example, the computer can include a facsimile machine 46 for transmitting information to other facsimile machines, computers or the like. Additionally, or alternatively, the computer can include a modem 48 to transfer information to other computers or the like. Further, the computer can include an interface (not shown) to a network, such as a local area network (LAN), and/or a wide area network (WAN). For example, the computer can include an Ethernet Personal Computer Memory Card International Association (PCM-CIA) card configured to transmit and receive information to and from a LAN, WAN or the like.

In one advantageous technique applicable to embodiments of the present invention, the methods according to embodiments of the present invention may be embodied in a software or data module, component, portfolio or the like, that can be manipulated or otherwise operated within a spreadsheet software program such as Excel. Such a technique may be advantageous in a number of different contexts, such as in the context of financial modeling and analysis. In this regard, modules, components and/or portfolio that perform various financial modeling functions can be combined to gain a more complete understanding of a financial context. Whereas a brief description of such a technique as such may be applied to the present invention will be described below, a more complete description of such a technique is described in U.S. patent application Ser. No. 10/705,030, entitled: Systems, Methods and Computer Program Products for Simulating at Least One Process in a Spreadsheet Environment filed Nov. 11, 2003, the contents of which are hereby incorporated by reference in its entirety.

According to such a technique, data capable of being manipulated to perform at least a portion of the methods of the present invention can be embodied in a module, which can thereafter be linked or otherwise associated with other portions of the methods of the present invention embodied in other modules so as to formulate a component. Then, if so desired, the component can be linked or otherwise associated with other components capable of performing other related methods to thereby form a portfolio. For example, methods of modeling future revenues according to embodiments of the present invention can be embodied in one module while methods of modeling nonrecurring cost according to embodiments of the present invention can be embodied in another module. The two modules can then be linked or otherwise associated with one another to formulate a component capable of generating a business case capable of modeling the market value of the good based upon the future revenues and the nonrecurring cost. Then, if so desired, the component for generating the business case can be linked or otherwise associated with another component to perform another function.

According to one aspect of the present invention, the system of the present invention generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium. It should be understood that the computer-readable program code portions may include separate executable portions for performing distinct functions to accomplish methods of embodiments of the present invention. Additionally, or alternatively, one or more of the computer-readable program portions may include one or more executable portions for performing more than one function to thereby accomplish methods of embodiments of the present invention.

In this regard, FIGS. 1 and 4 are a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. By way of but one example, the contingent claims valued by the system, method and computer program product of the present invention may be American style calls, as opposed to the European style calls referenced in the above-described examples. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of modeling bounds of uncertainty of future benefits of a good comprising:

determining a mean value and standard deviation associated with the future benefit of the good for each time segment, wherein the mean value is determined based upon a growth rate associated with the future benefit of the good for the respective time segment, and wherein the standard deviation is determined based upon an uncertainty for the good for the respective time segment; and modeling, with a computer processor, an upper and lower bound of uncertainty associated with the future benefit of the good over time, wherein modeling the upper and lower bounds of uncertainty is based upon the mean value and standard deviation for each time segment to thereby define a cone of uncertainty that increases outwardly as time progresses, wherein modeling the upper and lower bounds of uncertainty comprises modeling the upper and lower bounds of uncertainty for each time segment t based upon the future benefit of the good at time t and a distribution defined by a mean value of the future benefit of the good at time t+1 and a standard deviation of the future benefit of the good at time t+1.

2. A method according to claim 1 further comprising defining a growth rate for the good for each time segment before determining the mean value.

3. A method according to claim 2, wherein defining a growth rate for each time segment comprises defining a growth rate for each time segment such that the growth rate for at least one time segment differs from the growth rate of at least one other time segment.

4. A method according to claim 2, wherein defining a growth for each time segment comprises defining a growth rate for each time segment independent of an uncertainty for the respective time segment, and wherein the method further comprises determining an uncertainty for each time segment independent of a growth rate for the respective time segment.

5. A method according to claim 1 further comprising determining an uncertainty for each time segment such that the uncertainty for at least one time segment differs from the uncertainty of at least one other time segment.

6. A method according to claim 1, wherein modeling an upper and lower bound of uncertainty comprises modeling an upper and lower bound of uncertainty further based upon an inverse of a standard normal cumulative distribution, and wherein the standard normal cumulative distribution is defined by a probability.

7. A method according to claim 6, wherein modeling an upper and lower bound further comprises selecting a lower probability associated with the lower bound and an upper probability associated with the upper bound, wherein selecting the lower probability comprises selecting a lower probability higher than zero, and wherein selecting a higher probability comprises selecting a higher probability lower than one.

8. A method according to claim 1 further comprising normalizing the mean value for each time segment based upon the standard deviation and normalizing the standard deviation for each time segment based upon the mean value, wherein modeling an upper and lower bound of uncertainty comprises modeling an upper and lower bound of uncertainty for each time segment based upon the normalized mean value and normalized standard deviation.

9. A method according to claim 1, wherein modeling bounds of uncertainty of future benefits comprises modeling bounds of uncertainty of future benefits of the good with a processing element operating a spreadsheet software program, and wherein the method further comprises presenting a display of the upper and lower bounds of uncertainty on a display coupled to the processing element.

10. A method according to claim 9, wherein presenting the display comprises presenting a display of the upper and lower bounds of uncertainty comprising a plot of the upper and lower bounds of uncertainty and associated time segments.

11. A method according to claim 1, wherein determining a mean value comprises determining a mean value for at least one time segment of the period of time further based upon execution of a contingent activity.

12. A method according to claim 11, wherein determining a mean value comprises determining a mean value for at least one time segment further based upon execution of a contingent activity at the at least one previous time segment.

13. A system for modeling bounds of uncertainty of future benefits of a good comprising:
a computer processor configured to determine a mean value and standard deviation associated with the future benefit of the good for each time segment, wherein the processing element determines the mean value based upon a growth rate associated with the future benefit of the good for the respective time segment, wherein the computer processor is configured to determine the standard deviation based upon an uncertainty for the good for the respective time segment, wherein the computer processor is configured to model an upper and lower bound of uncertainty associated with the future benefit of the good over time, wherein modeling the upper and lower bounds of uncertainty is based upon the mean value and standard deviation for each time segment to thereby define a cone of uncertainty that increases outwardly as time progresses, and wherein the computer processor is configured to model the upper and lower bounds of uncertainty by modeling the upper and lower bounds of uncertainty for each time segment t based upon the future benefit of the good at time t and a distribution defined by a mean value of the benefit of the good at time t+1 and a standard deviation of the future benefit of the good at time t+1.

14. A system according to claim 13, wherein the computer processor is also configured to define a growth rate for the good for each time segment before determining the mean value.

15. A system according to claim 14, wherein the computer processor is configured to define a growth for each time segment independent of an uncertainty for the respective time segment, and wherein the computer processor is configured to determine an uncertainty for each time segment independent of a growth rate for the respective time segment.

16. A system according to claim 14, wherein the computer processor is configured to define a growth rate for each time segment such that the growth rate for at least one time segment differs from the growth rate of at least one other time segment.

17. A system according to claim 13, wherein the computer processor is configured to determine an uncertainty for each time segment such that the uncertainty for at least one time segment differs from the uncertainty of at least one other time segment.

18. A system according to claim 13, wherein the computer processor is configured to model the upper and lower bound of uncertainty further based upon an inverse of a standard normal cumulative distribution, and wherein the standard normal cumulative distribution is defined by a probability.

19. A system according to claim 18, wherein the computer processor is configured to model an upper and lower bound by further selecting a lower probability associated with the lower bound and an upper probability associated with the upper bound, wherein the computer processor is configured to select a lower probability higher than zero, and wherein the computer processor is configured to select a higher probability lower than one.

20. A system according to claim 13, wherein the computer processor is configured to normalize the mean value for each time segment based upon the standard deviation and to normalize the standard deviation for each time segment based upon the mean value, wherein the computer processor is configured to model an upper and lower bound of uncertainty by modeling an upper and lower bound of uncertainty for each time segment based upon the normalized mean value and normalized standard deviation.

21. A system according to claim 13, wherein the computer processor is configured to operate at least one function within a spreadsheet software program to thereby model the bounds of uncertainty of future benefits of the good, and wherein the system further comprises:
a display capable of presenting the upper and lower bounds of uncertainty.

22. A system according to claim 21, wherein the display is capable of the upper and lower bounds of uncertainty as a plot of the upper and lower bounds of uncertainty and associated time segments.

23. A system according to claim 13, wherein the computer processor is configured to determine a mean value for at least one time segment further based upon execution of a contingent activity.

24. A system according to claim 23, wherein the computer processor is configured to determine a mean value for at least one time segment further based upon execution of a contingent activity at the at least one previous time segment.

25. A computer program product for modeling bounds of uncertainty of future benefits of a good, the computer program product comprising a non-transitory computer-readable storage medium having computer-readable program code portions stored therein, the computer-readable program portions comprising:
a first executable portion for determining a mean value and standard deviation associated with the future benefit of the good for each time segment, wherein the first executable portion determines the mean value based upon a growth rate associated with the future benefit of the good for the respective time segment, and wherein the first executable portion determines the standard deviation based upon an uncertainty for the good for the respective time segment; and
a second executable portion for modeling an upper and lower bound of uncertainty associated with the future benefit of the good over time, wherein modeling the upper and lower bounds of uncertainty is based upon the mean value and standard deviation for each time segment to thereby define a cone of uncertainty that increases outwardly as time progresses, and wherein the second executable portion for modeling the upper and lower bounds of uncertainty comprises an executable portion configured to model the upper and lower bounds of uncertainty for each time segment t based upon the future benefit of the good at time t and a distribution defined by a mean value of the benefit of the good at time t+1 and a standard deviation of the future benefit of the good at time t+1.

26. A computer program product according to claim 25 further comprising a third executable portion for defining a growth rate for the good for each time segment.

27. A computer program product according to claim 26, wherein the third executable portion defines a growth rate for each time segment such that the growth rate for at least one time segment differs from the growth rate of at least one other time segment.

28. A computer program product according to claim 25, wherein the third executable portion defines a growth rate for each time segment independent of an uncertainty for the respective time segment, and wherein the computer program product further comprises a fourth executable portion for determining an uncertainty for each time segment independent of a growth rate for the respective time segment.

29. A computer program product according to claim 25 further comprising a third executable portion for determining an uncertainty for each time segment such that the uncertainty for at least one time segment differs from the uncertainty of at least one other time segment.

30. A computer program product according to claim 25, wherein the fourth executable portion models an upper and lower bound of uncertainty further based upon an inverse of a standard normal cumulative distribution, and wherein the standard normal cumulative distribution is defined by a probability.

31. A computer program product according to claim 30, wherein the fourth executable portion models an upper and lower bound further by selecting a lower probability associated with the lower bound and an upper probability associated with the upper bound, wherein the fourth executable portion selects the lower probability higher than zero, and wherein the fourth executable selects a higher probability lower than one.

32. A computer program product according to claim 25 further comprising a fifth executable portion for normalizing the mean value for each time segment based upon the standard deviation and normalizing the standard deviation for each time segment based upon the mean value, wherein the fourth executable portion models an upper and lower bound of uncertainty by modeling an upper and lower bound of uncertainty for each time segment based upon the normalized mean value and normalized standard deviation.

33. A computer program product according to claim 32 further comprising a fifth executable portion for generating a display of the upper and lower bounds of uncertainty.

34. A computer program product according to claim 25, wherein the fifth executable portion generates a display of the upper and lower bounds of uncertainty comprising a plot of the upper and lower bounds of uncertainty and associated time segments.

35. A computer program product according to claim 25, wherein the first executable portion determines a mean value for at least one time segment further based upon execution of a contingent activity.

36. A computer program product according to claim 35 wherein the first executable portion determines a mean value for at least one time segment further based upon execution of a contingent activity at the at least one previous time segment.

* * * * *